United States Patent [19]

Fennemann

[11] Patent Number: 5,437,849
[45] Date of Patent: Aug. 1, 1995

[54] METHOD OF PROCESSWING VANADIUM-CONTAINING RESIDUES

[75] Inventor: Wolfgang Fennemann, Karben, Germany

[73] Assignee: Metallgesellschaft Aktiengesellschaft, Frankfurt am Main, Germany

[21] Appl. No.: 64,969

[22] Filed: May 20, 1993

[30] Foreign Application Priority Data

May 21, 1992 [DE] Germany ............... 42 16 798.1

[51] Int. Cl.⁶ ............... C01G 31/00; C22B 34/00; C22B 30/00; C01D 5/00
[52] U.S. Cl. ............... 423/66; 423/68; 423/87; 423/551; 423/553
[58] Field of Search ............... 423/66, 67, 68, 87, 423/62, 65, 551, 553; 502/24

[56] References Cited

U.S. PATENT DOCUMENTS

| | | | |
|---|---|---|---|
| 1,733,700 | 10/1929 | Stevens et al. | 423/68 |
| 2,521,367 | 9/1950 | Hegan | 423/551 |
| 2,697,650 | 12/1954 | Hixson et al. | 423/66 |
| 3,131,993 | 5/1964 | Gustison et al. | 423/68 |
| 3,752,759 | 8/1973 | Burg et al. | 423/66 |
| 3,840,637 | 10/1974 | Hardwick et al. | 423/68 |
| 4,092,401 | 5/1978 | Dreulle | 423/633 |
| 4,196,184 | 4/1980 | Sakowski | 423/474 |
| 4,243,550 | 1/1981 | Burk et al. | 423/68 |
| 4,432,953 | 2/1984 | Hubred et al. | 423/68 |
| 4,539,186 | 9/1985 | Schemel et al. | 423/66 |
| 4,540,562 | 9/1985 | Gardner | 423/66 |
| 4,861,565 | 8/1989 | Sefton et al. | 423/68 |
| 4,913,885 | 4/1990 | Seon et al. | 423/68 |
| 5,128,047 | 7/1992 | Stewart et al. | 423/102 |

FOREIGN PATENT DOCUMENTS

| | | | |
|---|---|---|---|
| 770058 | 10/1967 | Canada | 423/68 |
| 2288154 | 10/1975 | France . | |
| 2384854 | 3/1978 | France . | |
| 269780 | 4/1927 | United Kingdom | 423/68 |
| 1526927 | 10/1978 | United Kingdom | 423/62 |
| 1567140 | 5/1980 | United Kingdom | 423/62 |

OTHER PUBLICATIONS

Jack, et al "Leaching of Vanadium . . . and Coke Ash", Fuel, vol. 58, Aug. 1979, pp. 589-594.
Lehrbuch der analytischen und praeparativen anorganischen Chemie, Gerhard Jander et al, S. Hirzel Verlg, Stuttgart (1976), Partial.
Rechentafeln fuer die Chemische Analytik, Alfred Ruland, Walter de Gruyter, Berlin–New York, (1982), p. 144.

Primary Examiner—Steven Bos
Attorney, Agent, or Firm—Herbert Dubno; Jonathan Myers

[57] ABSTRACT

To process vanadium-containing residues, the residues are leached in an aqueous slurry with introduction of $SO_2$, the undissolved solids are removed. To effect a processing which is simple, economical and ecologically satisfactory, vanadium content is precipitated as a tetravalent vanadium compound from the sulfate solution at a pH from 7 to 9 by an addition of alkali metal hydroxide and the precipitate is removed from the alkali metal sulfate solution.

5 Claims, 1 Drawing Sheet

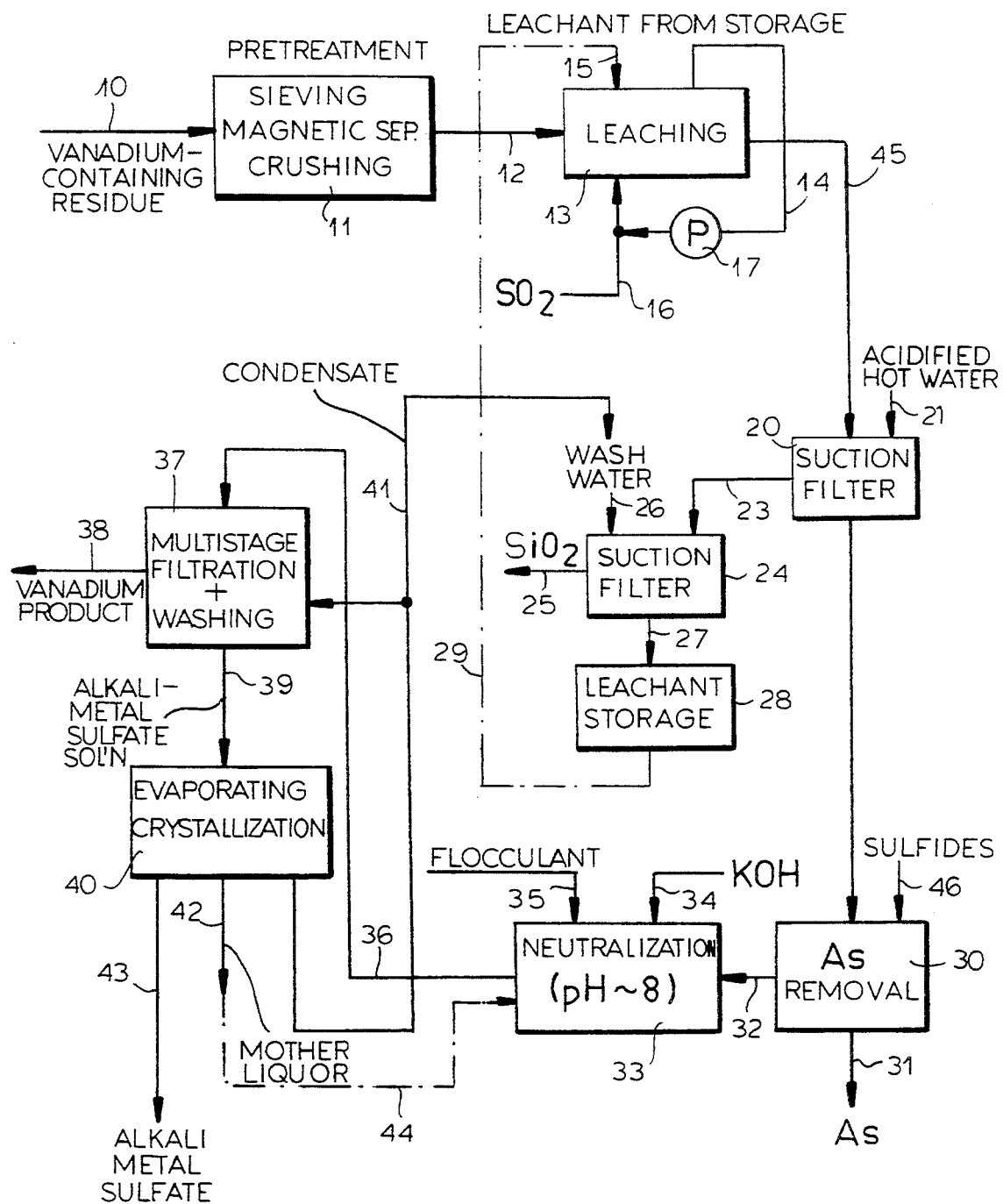

METHOD OF PROCESSWING VANADIUM-CONTAINING RESIDUES

SPECIFICATION

FIELD OF THE INVENTION

The present invention relates to a method of processing or working up vanadium-containing residues in which the residues are leached in an aqueous slurry with introduction of $SO_2$, the undissolved solids are removed, and the vanadium contained in the solution is precipitated.

BACKGROUND OF THE INVENTION

Vandaium-containing residues become available mainly in the form of used catalysts, e.g. from processes for the catalytic conversion of $SO_2$ to $SO_3$. The residues consist of the carrier material, generally silica, and the catalytically active substances.

In addition to vanadium compounds the residues may contain compounds of other metals, such as iron, arsenic, aluminum, calcium, cesium, and other alkali metals.

For ecological reasons such residues cannot be dumped or may be dumped only as hazardous waste because they contain water-soluble toxic substances.

For this reason and to recover valuable constituents of the residues, the residues are increasingly processed or worked up.

From Czechoslovakian Patent Specification 178,626 it is known to leach spent vanadium-containing catalysts in water with introduction of $SO_2$ so that the vanadium compounds are dissolved as $VOSO_4$. After the carrier material has been removed the $VOSO_4$ in solution is oxidized to $V^{5+}$ by the addition of $MnO_2$ or $NaClO_3$ and adjustment to a pH from 0.5 to 5.0. $V^{5+}$ is extracted by an amine having a high molecular weight in a water-insoluble solvent and is then reextracted by an alkaline solution. Thereafter, $V_2O_5$ is precipitated by a neutralization with $H_2SO_4$. That process requires a large number of process steps and a consumption of relatively expensive chemicals and a solution which contains alkali metal sulfate is formed in large quantities. That solution poses problems in disposal or recovery.

U.S. Pat. No. 4,913,885 discloses for the processing of vanadium-containing raw materials and particularly of spent catalysts a process in which the material is leached in an aqueous suspension in the presence of mixed gases comprising $SO_2$ and oxygen. It has been stated that conventional exhaust gases of industrial combustion processes which contain 5 to 20% $SO_2$, 10 to 30% $O_2$, balance inert gases, such as $N_2$, are particularly desirable. As a result, vanadium as $VOSO_4$ and other components as sulfates enter into solution. When the carrier material has been removed, the $VOSO_4$ in the solution is oxidized by an addition of oxidizers, such as $MnO_2$ or $NaClO_3$ to $V^{5+}$, which is then precipitated as $NH_4VO_3$ by an addition of $NH_3$, the precipitate is removed and the precipitate is then calcined to form $V_2O_5$. The oxidation of $VOSO_4$ to $V^{5+}$ requires the addition of oxidizers and causes additional metals to enter into solution. The solution contains a number of dissolved metals and also surplus ammonium sulfates. This renders use of the solution, processing or disposal more difficult.

OBJECTS OF THE INVENTION

It is therefore an object of the present invention to provide a process for processing vanadium-containing residues which is simple, economical and ecologically satisfactory.

SUMMARY OF THE INVENTION

This object is accomplished in accordance with the invention in that the vanadium content is precipitated as a tetravalent vanadium compound from the sulfate solution at a pH from 7 to 9 by an addition of alkali metal hydroxide and the precipitate is removed from the alkali metal sulfate solution.

More particularly, the method of processing the vanadium containing residue according to the invention comprises the steps of:

(a) introducing $SO_2$ into an aqueous slurry containing the vanadium-containing residue and leaching vanadium from the residue into a sulfate solution forming an aqueous phase of the slurry;

(b) precipitating vanadium as a tetravalent vanadium compound from the sulfate solution by bringing a pH of the sulfate solution to 7 to 9 by addition of an alkali metal hydroxide to the sulfate solution;

(c) removing a tetravalent vanadium precipitate from the resulting sulfate solution.

The residues are pretreated before the leaching in dependence on their composition. For instance, in the processing or spent catalysts it is possible to separate scale by magnetic separation and to subject packing elements to classification. The purified residue is then reduced to the particle size required for leaching. The vanadium is usually present in the waste materials in pentavalent form. The pentavalent compounds have low solubility and for this reason are converted in accordance with $V_2O_5 + H_2 + SO_2 = V_2O_4 + SO_4$.

For technological reasons, the $V_2O_4$ is dissolved as a sulfate so that $H_2SO_4$ is required. The sulfuric acid formed the reduction of $V^{5+}$ to $V^{4+}$ with $SO_2$ provides only one-half of the quantity which is stoichiometrically required to dissolve the $V_2O_4$ In accordance with $V_2O_4 + 2H_2SO_4 = 2VOSO_4 + 2H_2O$.

The sulfuric acid which is additionally required can be provided in various waye, namely:

by the simultaneous use of an oxygen-containing gas with or without inert gas in the leaching with $SO_2$ to generate the additional $H_2SO_4$ required in accordance with $SO_2 + \frac{1}{2} O_2 + H_2O = H_2SO_4$;

by the addition of oxygen-releasing chemicals during the leaching with introduction of $SO_2$ so that the released oxygen reacts in accordance with the previous relationship;

by the addition of $H_2SO_4$ during the leaching with introduction of $SO_2$; or by a combination of the above methods.

The undissolved solids left after the leaching are removed from the solution. In the processing of spent catalysts, the solids usually are constituted by the $SiO_2$-containing carrier.

The solids are washed and may be re-used or dumped. The water used for washing can be recycled to the leaching step.

The alkali metal hydroxide which is added to the sulfate solution to precipitate its vanadium content will be selected with a view to the further use of the alkali metal sulfate solution. NaOH, KOH or CsOH are generally used separately or in a mixture.

At the pH adjusted in accordance with the invention all metals, with the exception of the alkali metal, such as Fe, Al, Ca, etc., are at least predominantly precipitated together with the vanadium content and are then removed from the alkali metal sulfate solution together with the vanadium content. Because the precipitation takes place near the neutral point, it is not necessary to use alkali hydroxide in a surplus. Rather, the alkali hydroxide is approximately required in an amount which stoichiometrically corresponds to the $SO_4{=}$ content of the sulfate solution. The pure alkali metal sulfate solution may be used as follows:

in the form in which it has been formed;
as a solid after crystallization;
as a solid and/or liquid after fractional crystallization.

The pure alkali metal sulfate solution can be strengthened and then be reused to make catalyst. After crystallization it may be used as a fertilizer or in the production of catalysts. By fractional crystallization, different alkali metal sulfates can be separated and it is possible to recover, e.g., pure or enriched Cs sulfate, which can then be used, e.g., to produce catalyst.

The precipitated vanadium compounds are washed in a countercurrent in a plurality of stages. The hydroxide which has been filtered off can be used as a valuable raw material for the recovery of vanadium.

The advantages afforded by the invention reside in that the precipitation as $V^{4+}$ does not require an oxidation step to a higher oxidation number and the use of an oxidizer is not necessary and that the precipitation of all metals, with the exception of the alkali metals, results in the formation of a pure alkali metal sulfate solution.

Only one specified pH value is required for formation of the pure alkali metal sulfate solution whereas for a precipitation as $V^{5+}$ several pHs for different metals would be required. The only chemical which is added is alkali metal hydroxide, which is required in relatively small amounts. Liquids or solids which would have to be dumped are not formed.

According to a preferred feature, sulfuric acid is added during the leaching with $SO_2$. This accelerates the reaction because it is not necessary first to form the sulfuric acid, the consumption of $SO_2$ is correspondingly lower, and it is possible to operate the process in a closed cycle without the formation of exhaust gas if pure $SO_2$ is used. The case of an addition of sulfuric acid, an $O_2$-free or low-$O_2$ $SO_2$ gas is preferably used in order to prevent formation of surplus sulfuric acid in accordance with $SO_2 + \frac{1}{2} O_2 + H_2O = H_2SO_4$. The surplus sulfuric acid would give rise to a correspondingly higher consumption of neutralizing agent.

According to a preferred feature, about 1 mole of sulfuric acid is added per mole of $V_2O_5$ during the leaching. This results in a complete reaction without the need for a larger amount of neutralizing agent in the subsequent proceeding.

According to a preferred feature, gas which is evolved during the leaching and contains surplus $SO_2$ is recycled to the leaching step. This approach is particularly desirable when pure or highly concentrated $SO_2$ gas is employed, because no exhaust gas or only a small amount of exhaust gag is formed.

According to a preferred feature, arsenic is precipitated from the sulfate solution by the addition of sulfides before the vanadium compounds are precipitated and is removed. In this case any arsenic contained in the residue is precipitated before the vanudium precipitation with hydroxide. Precipitation of As with the vanadium would render the processing of the vanadium content more difficult. The sulfide employed is an alkali metal sulfide, which is selected with a view to the desired alkali metal content of the alkali metal sulfate solution.

BRIEF DESCRIPTION OF THE DRAWING

The above and other objects, features and advantages of the invention will become more readily apparent from the follow description, reference being made to the accompanying highly diagrammatic drawing, the sole FIGURE of which is a flow diagram illustrating principles of the invention.

SPECIFIC DESCRIPTION

As can be seen from the drawing, the vanadium containing residue at 10 can be subjected to a pretreatment in stage 11 which can include sieving, magnetic separation to remove scale, crushing, etc. to provide the solid phase 12 which is slurried at the leaching stage 13 in an aqueous phase in which sulfate is formed by the introduction of $SO_2$ at 16, recycled leachant at 15 or aqueous sulfuric acid and, if desired, sulfuric acid from some other source.

Following the leaching stage in the presence of $SO_2$, the slurry is delivered at 45 to a suction filter 20 from which the filtrate is removed at 22 as the aqueous phase. The solid phase is sujected to a first wash with acidified hot water fed at the resulting wash water can contribute to the recovered filtrate which contains tho vanadium component.

This filtrate may also contain arsenic and tho arsenic can be removed in a stage 30 in which sulfides are added at 46. The precipitated arsenic compounds are separated out at 31.

The aqueous sulfate phase, containing the vanadium constituent is fed at 32 to the neutralization stage 33 which is operated at a pH between 7 and 9, e.g. about 8, and to which an alkali metal hydroxide, such as KOH added at 34.

The vanadium precipitates out as tetravalent vanadium and the resulting slurry can be fed at 36 to a multistage filtration and washing and represented at 37.

The solids are removed at 38 as a valuable vanadium product and the filtrate is an alkali metal sulfate solution 39 which can be subjected to evaporative crystallization at 40.

From the evaporative crystallization at 40, a condensate 41 is recovered which can be recycled partly as a washing liquid for the filtration and washing stage 37 and partly as a washing liquid for the filtration and washing stage 24 (as wash water 26).

The evaporative crystallization can yield a mother liquor which can be returned at 44 to the neutralization stage 33.

The balance is a moist solid in crystalline form, i.e. the alkali metal sulfate which can be recovered for use at 43.

From the suction filter 20, the solid phase 23 can be subjected to a second wash with wash water 26 as represented by the filter stage 24.

The solid product recovered from the filter is the $SiO_2$ carrier of the catalyst forming the residue at 10. The aqueous phase forming the filtrate at 27 contains sulfate and vanadium and may be stored at 28 as a leachant which ultimately is fed at 29 to the leachant by 15 to the leaching stage 13.

A flocculent can be added as represented at 35 to the neutralization stage 33.

From the leaching stage 13, evolved gases, including surplus $SO_2$, can be collected at 14 and recycled by a blower 17 to the $SO_2$ distributor of the leaching stage 13.

SPECIFIC EXAMPLE

A spent catalyst is pretreated by the following preliminary steps:
sieving with 20 mm mesh sieve to remove ceramic particles;
magnetic separation to remove scale; and
crushing to below 2 mm to provide a fine-grained starting material.

1 kg of the thus prepared fine.-grained material (composed as stated in column 1 of the Table), were stirred at 80° in a closed container together with 2.26 kg of the second filter cake wash obtained in the filtration of a preceding charge. By means of a precalculated amount of sulfuric acid the suspension was acidified to provide a molar ratio of 1:1 of $V_2O_5$ to $H_2SO_4$.

Gas was sucked from the gas space of the container by a fan and was forced through a submerged gas distributor into the suspension. The consumption of gas was compensated so as to maintain a controlled pressure in that pure $SO_2$ was introduced at such a rate that a very slight superatmospheric pressure was maintained.

The leaching was interrupted by a termination of the introduction of $SO_2$ after two hours. The resulting suspension was filtered in a hot state through a suction filter and the filter cake was washed in two stages with slightly acidified hot water (first stage: 1 kg washing water; 2nd stage: 2 kg washing water). The first filter cake wash was combined with the primary filtrate to provide 2.7 kg sulfate solution.

The second filter cake wash was stored as a leaching liquor for the next charge. The $SiO_2$ product which had been filtered off (1.36 kg in a moist or 0.6 kg in a dry state) constitutes a product which can be used for numerous purposes and has the composition indicated in column 2 of the Table.

The sulfate solution was combined with 0.05 kg mother liquor from the crystallization of alkali metal sulfate and the resulting mixture was neutralized by an addition of potassium hydroxide solution at 60° C. with stirring and was adjusted to pH 8.0. After a flocculating agent had been added, the resulting hydroxide suspension was filtered and then washed in a counter-current in three stages
(1st stage: 3.3 kg second filter cake wash from the preceding charge,
2nd stage: 3.3 kg third filter cake wash from the preceding charge,
3rd stage: 2.83 kg water).

The primary filtrate and the first filter cake wash were combined to provide 5.35 kg alkali metal sulfate solution. The second and third filter cake washes were stored as washing liquors for the next charge. The vanadium product which had been filtered off (0.8 kg in a moist state or 0.11 kg in a dry state) is a valuable vanadium raw material having the composition which is apparent from column 3 of the Table. The alkali metal sulfate solution was subjected to an evaporating crystallization, which provided:
4.77 kg condensate (for use as washing water during the two filtering stages of the next charge);
0.05 kg mother liquor (to remove impurities by the supply into the neutralizing stage for the next charge);
alkali metal sulfate (0.52 kg in a moist state or 0.48 kg in a dry state) having the composition stated in column 4 of the Table.

The ceramic bodies removed by sieving were washed with water. The small amount of laden water thus obtained was also used in the leaching step. The washed bodies may be used for a desirable use, e.g. reused as a covering material in catalyst trays or as a raw material in the ceramic industry. The scale removed by magnetic separation was also washed with water and the small amount of laden water thus obtained was also supplied to the leaching step. Scale may be used as a raw material to make iron. Waste materials which cannot be utilized (exhaust gas, waste water, solids) were not obtained.

Where preliminary analysis showed the catalyst to contain arsenic, an additional purification step is performed. In that case the arsenic which might, during the leaching, have entered the sulfate solution, is precipitated out of that solution as a sulfide, e.g., by means of $Na_2S$. In one case, in which the arsenic content of the spent catalyst caused the sulfate solution to contain 295 ppm $As_2O_3$, that content was decreased below 2 ppm (detection limit) by the addition of $Na_2S$ in five times the stoichiometric amount. The resulting arsenic residue contained 11.0% arsenic and amounted to about 28 g in a moist state or 7 g in a dry state.

TABLE

Product Compositions in % by weight

| Column | Spent Catalyst* 1 | $SiO_2$ Product 2 | Vanadium Product 3 | Alkali metal sulfate 4 | As residue 5 |
|---|---|---|---|---|---|
| $V_2O_5$ | 6.4 | 0.57 | 54.5 | 0.0015 | 0.38 (V) |
| $K_2O$ | 9.1 | 0.45 | 2.1 | 48.3 | 0.71 |
| $Na_2O$ | 2.20 | 0.06 | 0.06 | 4.3 | 0.05 |
| $SiO_2$ | 57 | 95 | 0.77 | 0.015 | n.d. |
| $SO_3$ | 19.1 | 0.84 | 1.64 | 47.0 | 80 (S) |
| $Fe_2O_3$ | 4.45 | 2.02 | 28.1 | 0.003 | 1.04 |
| $Al_2O_3$ | 0.96 | 0.60 | 4.2 | <0.002 | n.d. |
| CaO | 0.36 | 0.12 | 0.54 | 0.32 | n.d. |
| $As_2O_3$ | 0.004 | 0.003 | 0.02 | <0.0001 | 11 (As) |
| $H_2O$ | n.d. | n.d. | 7.85 | n.d. | n.d. |

*Fine-grained starting material after sieving, magnetic separation, and crushing n.d. not determined

I claim:

1. A method of processing a residue consisting essentially of pentavalent vanadium compound, said, residue derived from a supported catalyst for the conversion of $SO_2$ to $SO_3$, which comprises the steps of:
    (a) in a closed cycle introducing $SO_2$ in an oxygen-free gas into an aqueous slurry containing a pentavalent vanadium-containing residue to leach vanadium from the residue into a sulfate solution;
    (b) adding about 1 mole of sulfuric acid to said sulfate solution per mole of $V_2O_5$ during the leach in step (a);
    (c) precipitating tetravalent vanadium compound and forming an alkali metal sulfate by adding an alkali metal hydroxide to said sulfate solution to bring a pH of said sulfate solution to 7 to 9, to form a second slurry which contains precipitated tetravalent vanadium compound and the alkali metal sulfate;
    (d) filtering the second slurry to separate the precipitated tetravalent vanadium compound from the alkali metal sulfate in solution, and recovering the precipitated tetravalent vanadium compound;
    (e) subjecting the alkali metal sulfate in solution to evaporative crystallization to obtain the alkali metal sulfate as a moist solid in crystalline form and a mother liquor, and recovering the alkali metal sulfate;

(f) combining the mother liquor with the second slurry formed in step (c); and (g) recovering $SO_2$-containing gas evolved during the leach in step (a), and recycling said $SO_2$-containing gas to said slurry in step (a).

2. The method defined in claim 1 wherein according to step (c) the adding of the alkali metal hydroxide is carried out at 60° C. with stirring, and then a flocculating agent is added.

3. The method defined in claim 1, wherein arsenic is contained in the residue and further comprising the step of precipitating arsenic from said sulfate solution prior to step (b) by addition of a sulfide to said sulfate solution, and removing a precipitated arsenic compound from said sulfate solution.

4. The method defined in claim 1, wherein according to step (c), the alkali metal hydroxide is cesium hydroxide, and a cesium sulfate solution is recovered during step (e).

5. The method defined in claim 1, wherein following step (a), the sulfate solution containing the vanadium is suction-filtered to separate out a solid catalyst support from the sulfate solution.

* * * * *